(12) United States Patent
Moon et al.

(10) Patent No.: US 9,141,801 B2
(45) Date of Patent: Sep. 22, 2015

(54) APPARATUS AND METHOD FOR ANALYZING PERMISSION OF APPLICATION FOR MOBILE DEVICES AND DETECTING RISK

(71) Applicant: Electronics and Telecommunications Research Institute, Daejeon (KR)

(72) Inventors: Jong Sik Moon, Daejeon (KR); Seung Wan Han, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 33 days.

(21) Appl. No.: 13/973,194

(22) Filed: Aug. 22, 2013

(65) Prior Publication Data
US 2014/0245448 A1 Aug. 28, 2014

(30) Foreign Application Priority Data

Feb. 27, 2013 (KR) ........................ 10-2013-0021569

(51) Int. Cl.
*G06F 21/00* (2013.01)
*G06F 21/57* (2013.01)
(52) U.S. Cl.
CPC ..................................... *G06F 21/57* (2013.01)
(58) Field of Classification Search
CPC . H04L 63/1443; G06F 21/554; G06F 21/566; G06F 21/577
USPC ..................................................... 726/24, 25
See application file for complete search history.

(56) References Cited

U.S. PATENT DOCUMENTS

| | | | |
|---|---|---|---|
| 8,875,298 B2 * | 10/2014 | Li et al. ........................... | 726/25 |
| 2011/0047620 A1 * | 2/2011 | Mahaffey et al. ............... | 726/23 |
| 2013/0097706 A1 * | 4/2013 | Titonis et al. .................... | 726/24 |
| 2013/0117846 A1 * | 5/2013 | Mahaffey et al. ............... | 726/22 |
| 2013/0212684 A1 * | 8/2013 | Li et al. ........................... | 726/25 |
| 2014/0020094 A1 * | 1/2014 | Wang et al. ...................... | 726/22 |

FOREIGN PATENT DOCUMENTS

KR   101143999 B1   5/2012

OTHER PUBLICATIONS

Lucas Davi et al., "Privilege Escalation Attacks on Android", 13th International Conference, ISC 2010, Dec. 8, 2011, pp. 346-360, Springer-Verlag Berlin Heidelberg 2011.

* cited by examiner

*Primary Examiner* — Justin T Darrow
*Assistant Examiner* — Hee Song
(74) *Attorney, Agent, or Firm* — William Park & Associates Ltd.

(57) ABSTRACT

An apparatus for analyzing a permission of an application for a mobile device, the apparatus comprising: an executable file acquisition unit; a file extraction module; and an execution permission analyzing module configured to detect a security risk which can be caused by the permission on the basis of the permission described in the extracted file, wherein the information related to the permission of the application includes information on permission that is declared in the application, permission that the application uses and a function that uses the permission of the application.

15 Claims, 10 Drawing Sheets

Sextube-ANALYSIS SUMMARY

PERMISSION ANALYSIS SUMMARY

| DIVISION | CATEGORY | THE NUMBER OF PERMISSIONS |
|---|---|---|
| C0 | Network Communication | 1 |
| C1 | Hardware controls | 1 |
| C2 | Your location | 2 |

| TYPE | THE NUMBER OF TYPES | REMARKS |
|---|---|---|
| THE NUMBER OF PERMISSIONS CATEGORIES THAT ARE DECLARED | 3 | |
| THE NUMBER OF PERMISSIONS THAT ARE DECLARED | 1 | |
| THE NUMBER OF PERMISSIONS THAT ARE USED | 4 | INTERNET |
| THE NUMBER OF PERMISSIONS THAT ARE USED AFTER THE DECLARATION | 1 | |
| THE NUMBER OF PERMISSIONS THAT ARE NOT USED AFTER DECLARATION | 0 | |

FIG.6B

FUNCTION ANALYSIS SUMMARY

| DIVISION | CATEGORY | THE NUMBER OF FUNCTIONS | THE NUMBER OF ACCUMULATED USES |
|---|---|---|---|
| C0 | Network Communication | 5 | 7 |
| C1 | Hardware controls | 1 | 1 |
| C2 | Your location | 3 | 5 |
| | | | |
| | | | |
| | | | |

| TYPE | INFORMATION | REMARKS |
|---|---|---|
| THE NUMBER OF USER-DEFINED FUNCTIONS | 574 | |
| THE NUMBER OF USED SYSTEM FUNCTIONS | 509 | |
| THE MOST FREQUENTLY USED FUNCTIONS FUNCTION | 230 | java.lang.StringBuilder.append (java/lang/String) |
| THE NUMBER OF NDK LIBRARY | 0 | |
| | | NUM |

FIG. 7

APPARATUS AND METHOD FOR ANALYZING PERMISSION OF APPLICATION FOR MOBILE DEVICES AND DETECTING RISK

RELATED APPLICATIONS

This application claims the benefit of Korean Patent Application No. 10-2013-0021569, filed on Feb. 27, 2013, which is hereby incorporated by reference as if fully set forth herein.

FIELD OF THE INVENTION

The present invention relates to an apparatus and method for analyzing a permission of an application for mobile devices to detect a risk. More particularly, the present invention relates to an apparatus and method for investing whether a permission is declared more than an execution permission required to run an application or a function is set to use a permission that is undeclared and detecting a risk on the basis of the investigated result, thereby blocking elements of the risk due to an excessive use of the permission in advance and building a secure mobile ecosystem.

BACKGROUND OF THE INVENTION

Recently, the number of users that use an Android operating system in smart mobile devices (hereinafter, referred to as mobile devices) is increasing continuously, and thus the growth rate of an android market becomes faster. In particular, studies have reported that the growth rate of the Android market is about three times raster than the growth rate of the app Store of Apple Inc.

The rapid growth of the Android market is based on the explosive increase of the number of applications for Android, and thus, the security associated with personal information that are handled by the applications has emerged as an important issue. More specifically, the possibility that the personal information is flowing out through the applications is becoming increasing.

In connection with the issue of the security, the Android operating system allows each application to run through a sandbox independently, but gives execution permission to the application so as to control its access and sharing of device resources. That is, since the application runs in a process that is protected in the sandbox, it is possible to block a direct access from other external system or applications. If an access of the external system or applications to the device resources or the like is required, it is necessary to grant the access by requesting permission through an androidmanifest.xml file of the application that runs on the device.

However, a security problem may occur even in this security mechanism. Specifically, in a case where a developer of the application assigns permission that does not need to run the application, for example, if the permission to get location information of individual applications is declared to an application which is required to access only to the Internet, a user of the application is in risk of leaking personal information helplessly. In addition, as will be described herein below, there may also occur many cases that permission is set to allow a privilege escalation attack by mistake of the application developer.

To solve the above problem, the app store of Apple Inc. performs a formal screening procedure for applications that are uploaded to the app store, thereby preventing the problem in advance. However, for the Android market, the screening procedure is not adopted at present.

Therefore, in order to solve the problem, there is a need to provide an apparatus and method which are capable of analyzing a permission of applications that are uploaded to the Android market to report it to an administrator of the Android market.

SUMMARY OF THE INVENTION

In view of the above, an object of the present invention is to solve the aforementioned problems.

Further, the present invention provides an apparatus and method for analyzing whether permission of an application is declared more than necessary, analyzing whether a function is set to use a permission that is undeclared, comparing and analyzing permission declared in the application and a pre-defined pattern, and detecting a risk on the basis of the analyses, thereby blocking the leakage of individual information and building a secure mobile ecosystem.

In accordance with an embodiment of the present invention, there is provided an apparatus for analyzing a permission of an application for a mobile device, which includes: an executable file acquisition unit configured to acquire an executable file of the application; a file extraction module including an unpackaging unit, wherein the unpacking unit is configured to unpackage the executable file to extract a first file which describes the information about permission that is declared in the application and a permission that the application uses; and an execution permission analyzing module configured to detect a security risk which can be caused by the permission on the basis of the permission described in the extracted file, wherein the information related to the permission of the application comprises: information on permission that is declared in the application, permission that the application uses and a function that uses the permission of the application.

In the exemplary embodiment, wherein the file extraction module further includes: a reverse engineering unit configured to perform a reverse engineering on a second file that contains information on a function that uses the permission of the application among the unpackaged files by the unpackaging unit.

In the exemplary embodiment, wherein the reverse engineering unit is configured to convert the second file into a file having an extension of class or jar, which in turn is converted into a file having an extension of Java.

In the exemplary embodiment, wherein the execution permission analyzing module comprises: a declared permission analyzing unit configured to analyze the first file; a function extraction unit configured to parse the result that the second file has been subjected to the reverse engineering to extract the function that the application uses; a pattern analyzing unit configured to analyze the risk on the basis of a pre-defined pattern; and a permission risk analyzing unit configured to analyze the permission related to the application on the basis of the results of the declared permission analyzing unit, the function extraction unit and the pattern analysis unit and detect the risk, wherein the pre-defined pattern represents a pattern to call the function.

In the exemplary embodiment, wherein the permission risk analysis unit is configured to detect that a risk exists when there is at least one of a case where the permission is declared independently, a case where the declared permission has not been used, a case where the permission that are not declared is used via a function, or a case where a pattern that a function calls is identical to the pre-defined pattern in which there is the risk.

In the exemplary embodiment, wherein the application is an application for Android; the executable file of the application has an extension of apx; the first file is an androidmanifest.xml file; and the second file is a classes.dex file.

In the exemplary embodiment, the apparatus further comprises: an analysis result reporting unit configured to display the result analyzed by the execution permission analyzing module.

In accordance with another embodiment of the present invention, there is provided a method for analyzing a permission of an application for mobile devices, which includes: acquiring an executable file from the application for mobile devices; unpackaging the executable file to extract a first file, which describes the information about permission that is declared in the application and permission that the application uses; and detecting a security risk which can be caused by the permission on the basis of the permission described in the extracted file, wherein the information related to the permission of the application comprises: information on a permission that is declared in the application, permission that the application uses, and a function that uses the permission of the application.

In the exemplary embodiment, wherein said unpackaging the executable file to extract a first file further comprises: performing a reverse engineering on a second file that contains information on a function that uses the permission of the application among the unpackaged files.

In the exemplary embodiment, wherein said performing a reverse engineering on a second file comprises: converting the second file into a file having an extension of class or jar, which in turn is converted into a file having an extension of Java.

In the exemplary embodiment, wherein said detecting a security risk comprises: analyzing the first file; extracting a function that the application uses by parsing the result that the second file has been subjected to the reverse engineering; analyzing the risk on the basis of a pre-defined pattern; and analyzing the permission related to the application based on the results of said analyzing the first file, said extracting a function, and said analyzing the risk and detecting the risk, wherein the pre-defined pattern represents a pattern to call the function.

In the exemplary embodiment, wherein said analyzing the permission related to the application comprises: detecting that a risk exists when there is at least one of a case where the permission is declared independently, a case where the declared permission has not been used, a case where the permission that are not declared is used via a function, or a case where a pattern that a function calls is identical to the pre-defined pattern in which there is the risk.

In the exemplary embodiment, wherein the application is an application for Android; the executable file of the application has an extension of apx; the first file is an androidmanifest.xml file; and the second file is a classes.dex file.

In the exemplary embodiment, the method further comprising: reporting the analysis result analyzed by analyzing the permission related to the application so as to display it.

In accordance with another embodiment of the present invention, there is provided a computer-readable storage medium including computer executable instructions, wherein the instructions, when executed by a processor, causes the processor to perform the method.

In accordance with the embodiments of the present invention, it is possible to block elements of the risk due to an excessive use of the permission in advance and build a sound mobile ecosystem by investing whether permission is declared more than an execution permission required to run an application or a function is set to use a permission that is undeclared and detecting a risk on the basis of the investigated result.

BRIEF DESCRIPTION OF THE DRAWINGS

The above and other objects and features of the present invention will become apparent from the following description of the embodiments given in conjunction with the accompanying drawings, in which.

DETAILED DESCRIPTION AF THE EMBODIMENTS

A detailed description of the present invention described below will be made with reference to accompanying drawings showing by way of illustration of specific embodiments in which the present invention can be implemented. These embodiments will be fully explained in detail so that the present invention can be practiced by those skilled in the art. It should foe understood that the various embodiments of the present invention are different, but do not have to be mutually exclusive. For example, particular shapes, structures and properties that are described herein related to the embodiments may be implemented in other embodiments without departing from the spirit and scope of the present invention. It should be also understood that the arrangement or position of the individual components within the disclosure of the respective embodiments may be changed without departing from the spirit and scope of the present invention. Therefore, a following detailed description is not intended to take in a limiting sense, and if it will be described properly, the scope of the present invention is limited only to those claimed in the appended claims and all ranges of equivalents thereof. Like reference numerals refer to same or similar functions throughout the several aspects of the drawings.

Hereinafter, the exemplary embodiments of the present invention will be described with reference to the accompanying drawings in detail so that the present invention can be easily implemented by those skilled in the art.

Figure 1:
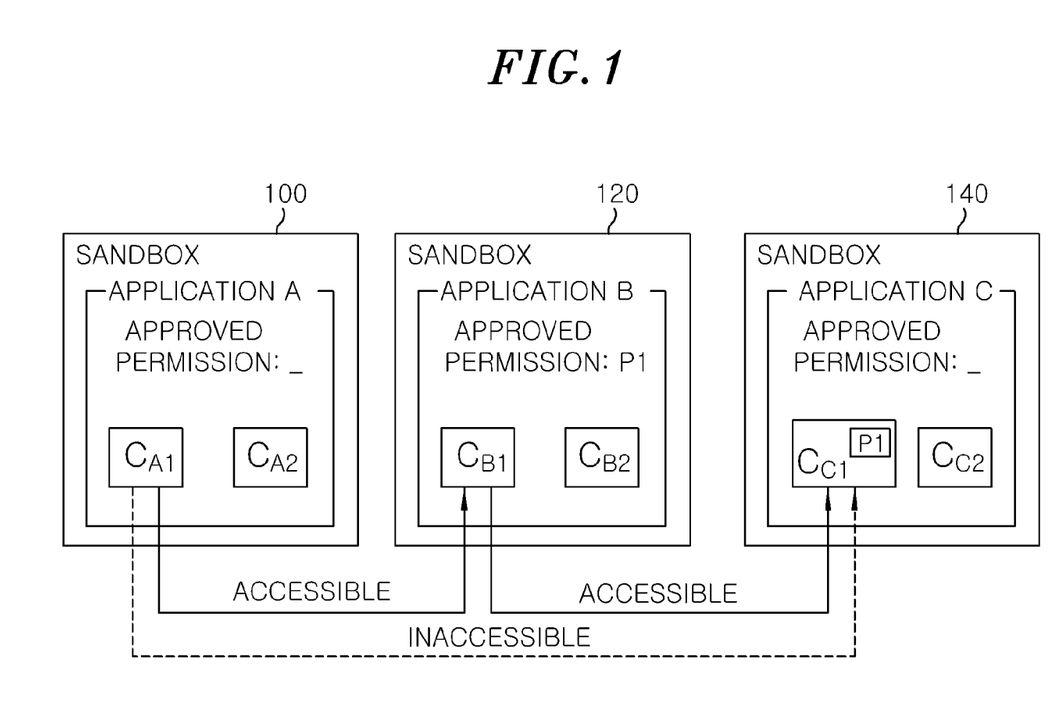
FIG. 1 illustrates an exemplary configuration explaining a privilege escalation attack using a permission declared in an application for a mobile device.

FIG. 1 is an exemplary configuration showing a privilege escalation attack using a permission declared in an application for a mobile device.

Referring to FIG. 1, each application A, B and C represents an application which runs on an Android operating system and has its own sandbox (which is denoted as its reference numeral 100, 120, 140). The application A does not have any permission that has been declared and has a component $C_{A1}$ and $C_{A2}$. The application B has a permission $p_1$ that has been declared and has components $C_{B1}$ and $C_{B2}$. The application C does not have any permission that has been and has components $C_{C1}$ that can be accessed with a permission $p_1$ and $C_{C2}$ that can be accessed with a permission $p_2$.

The component $C_{A1}$ of the application A is able to access the component $C_{B1}$ of the application B. More specifically, the permission $p_1$ is declared in the application B, but any permission is not declared in the component $C_{B1}$ of the application B; and, therefore, the component $C_{A1}$ of the application A is able to access the component $C_{B1}$ application B. In addition, the component $C_{B1}$ of the application B in which a permission $p_1$ has been declared is able to access the component $C_{C1}$ that can be accessed with a permission $p_1$ of the application C.

Here, as can be seen in FIG. 1, the component $C_{A1}$ of the application A cannot directly access the component $C_{C1}$ of the application C. More specifically, while the component $C_{A1}$ of the application A does not have any permission that has been declared, the components $C_{C1}$ of the application C can be accessed only by the component of an application to which the permission $p_1$ has been declared; and, therefore, the component $C_{A1}$ of the application A does not have direct access the component $C_{C1}$ of the application C.

However, the component $C_{A1}$ of application A is allowed to access the component $C_{C1}$ of the application C "through" the component $C_{B1}$ of the application B, which is called "privilege escalation". That is, the application A is allowed to access components of other applications using the permission which is declared in the application B. Therefore, this is called "privilege escalation" in that the permission of the application A brings the effect of elevated privilege due to the permission declared in the application B.

Developers typically do not intend to such privilege escalation. However, the attacker such as a hacker is able to attack the user by exploiting the privilege elevation. Therefore, the app store and Android market on which applications are uploaded (hereinafter, referred to as a central processing center) are required a system to investigate and analyze the permission that is declared in the application and blocks such an attack in advance.

Figure 2:
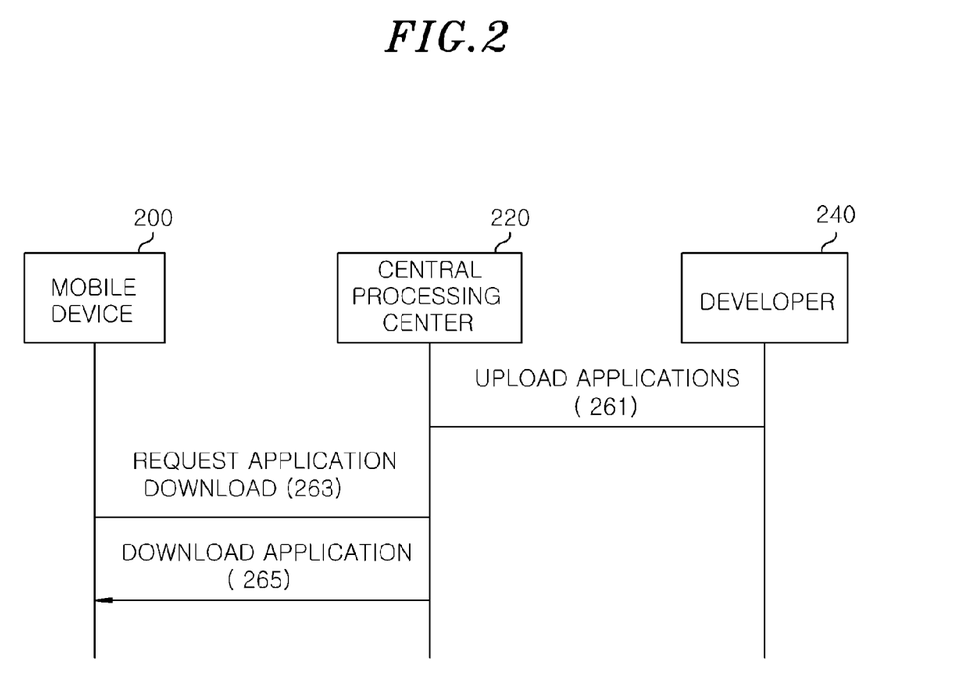
FIG. 2 is a schematic diagram exemplarily illustrating a system in which an embodiment of the present invention is operable.

FIG. 2 is a schematic diagram exemplarily illustrating a system in which an embodiment of the present invention is operable.

Referring to FIG. 2, a system in accordance with an embodiment of the present invention includes a mobile device 200, a central processing center 220 and a developer 240.

First, the mobile device 200 may include a variety of mobile devices such as smart phones, smart, pads, PDAs (Personal Digital Assistants), Wibro (Wide Broadband) terminals, and the like. Among others, the mobile device 200 may be mobile devices using the Android operating system. Further, the central processing center 220 represents a place where applications for mobile devices has been uploaded, and may include the app store of Apple Inc., the Android market and the like. Among others, the central processing center 220 may preferably include the Android market. Meanwhile, the developer 240 is a subject to develop applications that will be used in the mobile terminal 200.

The central processing center 220, in particular, the Android market, does not take a formal screening procedure for the applications that are uploaded, unlike the app store of Apple Inc. At present, thus, there is none of screening procedures even though a developer has set an application to have security vulnerability intentionally or negligently. That is, at present, a system does not exist, which is capable of preventing in advance a situation where a user of a mobile device 200 requests to download an application with security vulnerability which is uploaded on the central processing center 200 by the developer 240 in an operation 261, in an operation 263, and uses the application that is downloaded, in an operation 265.

In order to solve the problem with this situation, the embodiment of the present invention proposes a method to analyze a permission of an application that is uploaded on the central processing center 200, among other things, the Android market, and detect a risk in advance to report it to the manager. More specifically, when the developer 240 uploads the application to Android market, the embodiment of the present invention analyzes and investigates information related to the permission ox the application, and reports the analyzed results to the manager of the Android market, which may be installed and operated in the Android market. Hereinafter, the configuration and functionalities of the embodiment will be described in detail.

Figure 3:
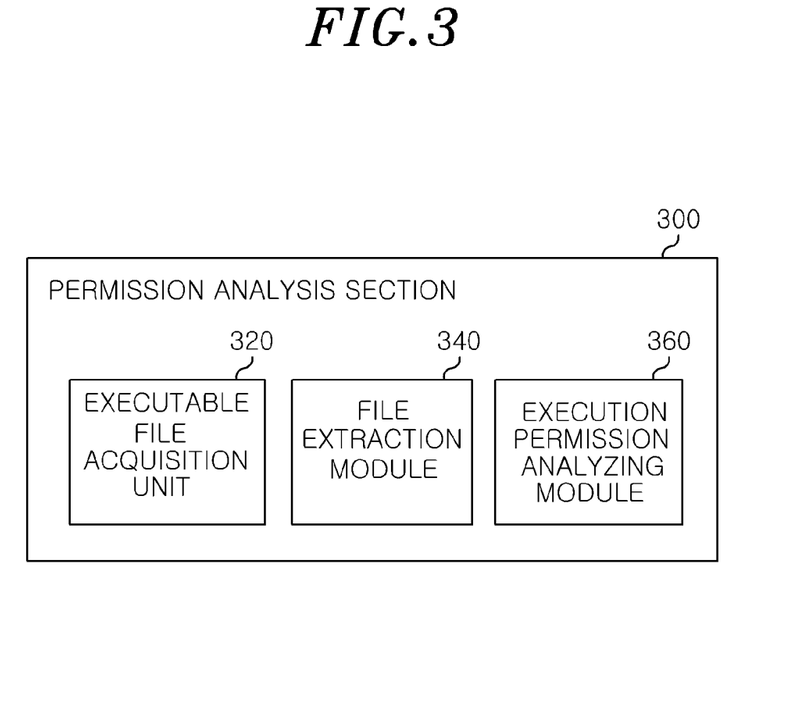
FIG. 3 illustrates a configuration showing an internal configuration of a permission analysis section for analyzing a permission of an application in accordance with an embodiment of the present invention.

FIG. 3 illustrates a configuration showing an internal configuration of a permission analysis section for analyzing a permission of an application in accordance with an embodiment of the present invention.

Referring to FIG. 3, a permission analysis section 300 in accordance with an embodiment of the present invention includes an executable file acquisition unit 320, a file extraction module 340 and an execution permission analyzing module 360.

In accordance with an embodiment of the present invention, the executable file acquisition unit 320 functions of acquiring an executable file of an application from the central processing center 200, the file extraction module 340 functions of extracting a file that contains information relating to a permission of the application from the executable file that has been acquired, and the execution permission analyzing module 360 functions of analyzing and detecting a risk on a basis of the extracted file.

Although not shown in the drawings, in accordance with another embodiment of the present invention, the permission analysis section 300 may further include an analysis result reporting unit for displaying the analysis result of the execution permission analyzing module 360.

The executable file acquisition unit 320 functions to acquire the executable fire of the application, for example, an Android package (apk) file of the application, a configuration of which will be explained as follows.

Figure 4A:
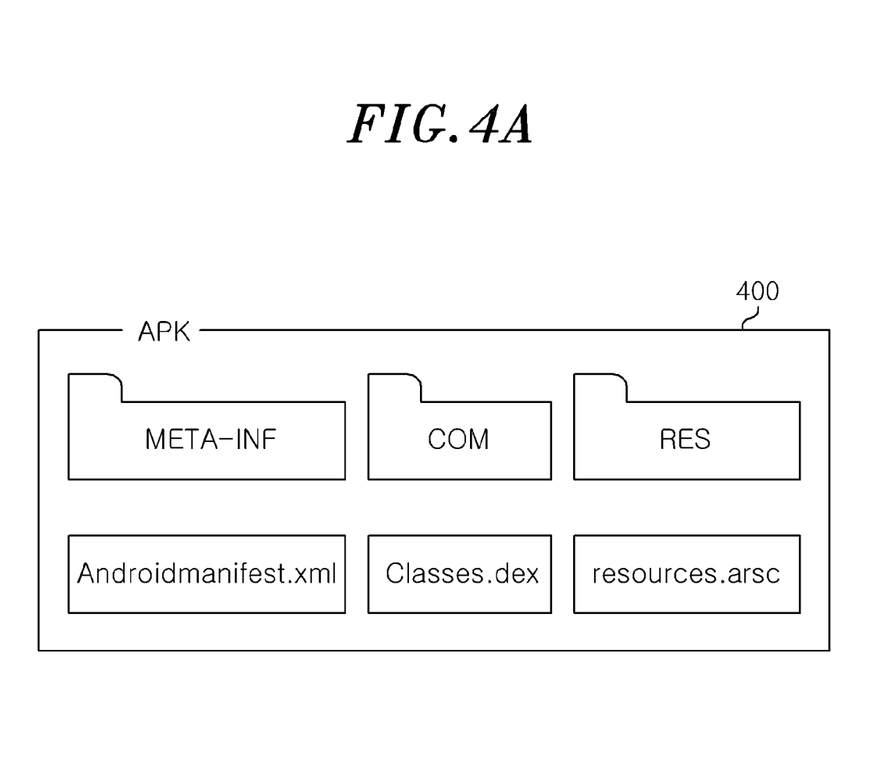
FIG. 4A illustrates an exemplary configuration of an apk file.

FIG. 4A illustrates an exemplary configuration of an apk file. Referring to FIG. 4A, the apk file 400 includes a META-INF folder, an assets folder and a res folder. The apk file 400 also includes an androidmanifest.xml file, a classes.dex file and a resources.arsc file, and may additionally include other folders and files. Specifically, the META-INF folder contains information about signatures, the assets folder contains information about external resources that are possessed by a package, the res folder contains information about internal resources that are possessed by a package, and the resources.arsc file contains information about the resources that have been compiled separately. The androidmanifest.xml file, which is associated with the embodiment of the present invention, contains information about the permission such as an Internet connection, an access to address books, an access to systems, etc., and the classes.dex file is a file that has information about classes implicitly. The conversion (or reverse engineering) of the classes.dex file may obtain Java source code.

The present invention extracts the androidmanifest.xml file from the apk file 400, analyzes information related to the permission of the application. Further, the embodiment of the present invention extracts the classes.dex file from the apk files 400 to analyze whether the application uses any function by converting the extracted file. Hereinafter, a description will be made on the file extraction module 340.

Figure 4B:
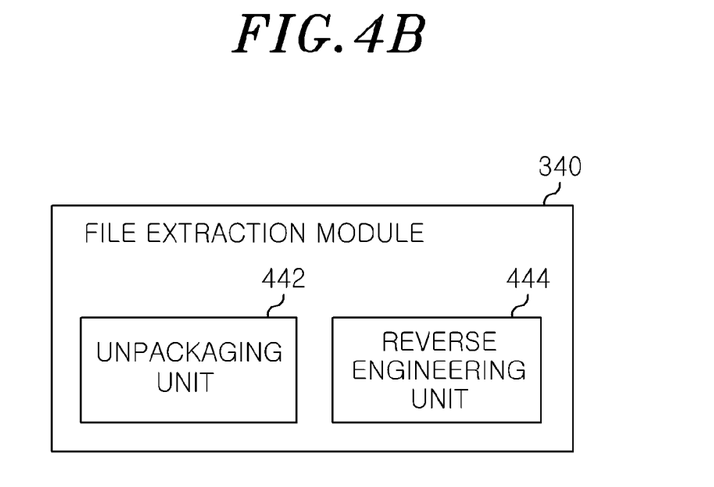
FIG. 4B is a block diagram showing an internal configuration of a file extraction module in accordance with an embodiment of the present invention.

FIG. 4B is a block diagram showing an internal configuration of a file extraction module 340 in accordance with an embodiment of the present invention.

Referring to FIG. 4B, the file extraction module 340 in accordance with an embodiment of the present invention includes a unpackaging unit 442 and a reverse engineering unit 444.

The unpackaging unit 442 unpackages the apk file and then extracts the androidmanifest.xml file and the classes.dex file from the apk file. The unpackaging unit 442 obtains information related to the permission from the extracted androidmanifest.xml file and obtains what function uses the permission from the classes.xml file, the process of which will be explained with reference to FIG. 4C.

While FIG. 4B has been shown to include both of the unpackaging unit 442 and the reverse engineering unit 444, alternatively, it is noted, if necessary to those of ordinary skill in the art, that the file extraction module 340 may include only the unpackaging unit 442 but not include the reverse engineering unit 444. In a case where the embodiment of the present invention does not include the reverse engineering unit 444, it is not possible to get information about what function uses the permission, except only information about the permission that is contained in the androidmanifest.xml file. However, the following description will be made on an embodiment in which the file extraction 340 includes both the unpackaging unit 442 and the reverse engineering unit 444.

Figure 4C:
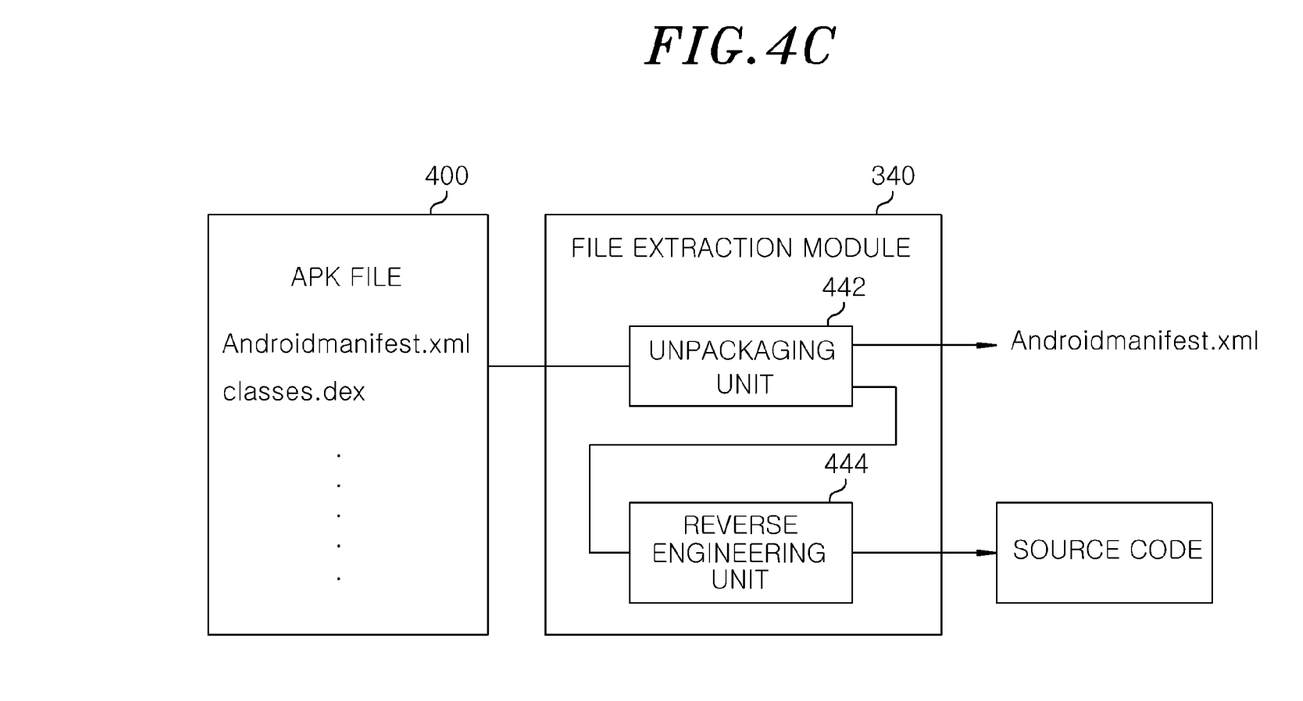
FIG. 4C is a conceptual diagram exemplarily illustrating a process of extracting files by a file extraction module in accordance with an embodiment of the present invention.

FIG. 4C is a conceptual diagram exemplarily illustrating a process of extracting files by the file extraction section 340 in accordance with an embodiment of the present invention;

Referring to FIG. 4C, the unpackaging unit 442 of the file extraction section 340 unpackages the apk file acquired by the executable file acquisition unit 320 and obtains the androidmanifest.xml file and the classes.dex file. Specifically, the unpackaging unit 442 changes the extension of the apk file 400 to a zip before unpackaging the apk file. Among the unpackaged files, the androidmanifest.xml file is transferred to the execution permission analyzing module 360 for the analysis thereof, and the classes.dex file is subjected to the reverse engineering in the reverse engineering unit 444 and then is transferred to the execution permission analyzing module 360 for the analysis thereof. The process of performing the reverse engineering on the classes.dex file will be described with reference to FIG. 4D as follows.

Figure 4D:
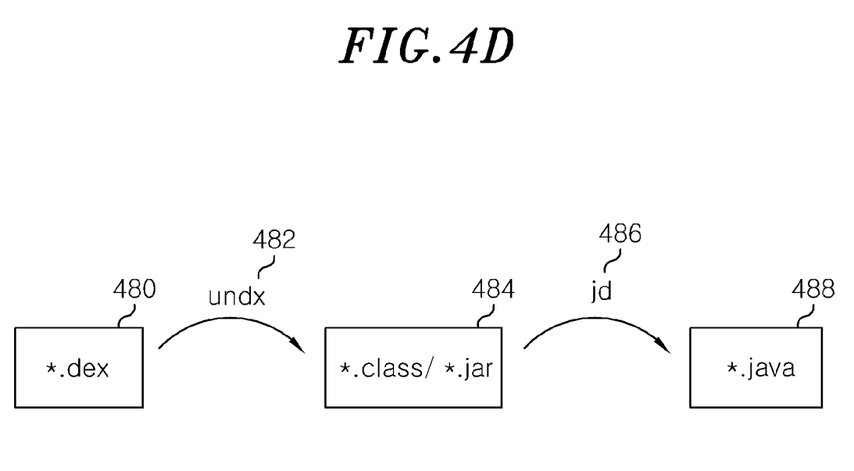
FIG. 4D is a conceptual diagram exemplarily illustrating a process of performing a reverse engineering on a classes.dex file in accordance with an embodiment of the present invention.

FIG. 4D is a conceptual diagram exemplarily illustrating a process of performing the reverse engineering on the classes.dex file in accordance with an embodiment of the present invention. The reverse engineering process in accordance with an embodiment of the present invention is as follows. The classes.dex file 480 is converted into *.class or *.jar 484 through the use of an undx 482, which in turn is converted into *.java 484 using jd 486. In this case, the undx 482 and jd 486 are ones of Java commands.

Alternatively, although not shown, the reverse engineering process in accordance with another embodiment of the present invention may be performed as follows. The classes.dex file 480 is converted into *.jar file using dex2jar, which in turn is converted into *.java using jad. In this case, the dex2jar or the jad are also ones of the Java commands.

While two examples of the reverse engineering process are proposed herein, it should be noted that it is not intended to limit the embodiment of the present invention only to the reverse engineering process as set forth above, and any method which converts the classes.dex file into *.java file may be included in the embodiment of the present invention.

In accordance with an embodiment of the present invention, the execution permission analyzing module 360 analyzes the androidmanifest.xml file and the classes.dex file that are extracted from the file extraction module 340 in such a manner as described above and detects a risk.

Figure 5:
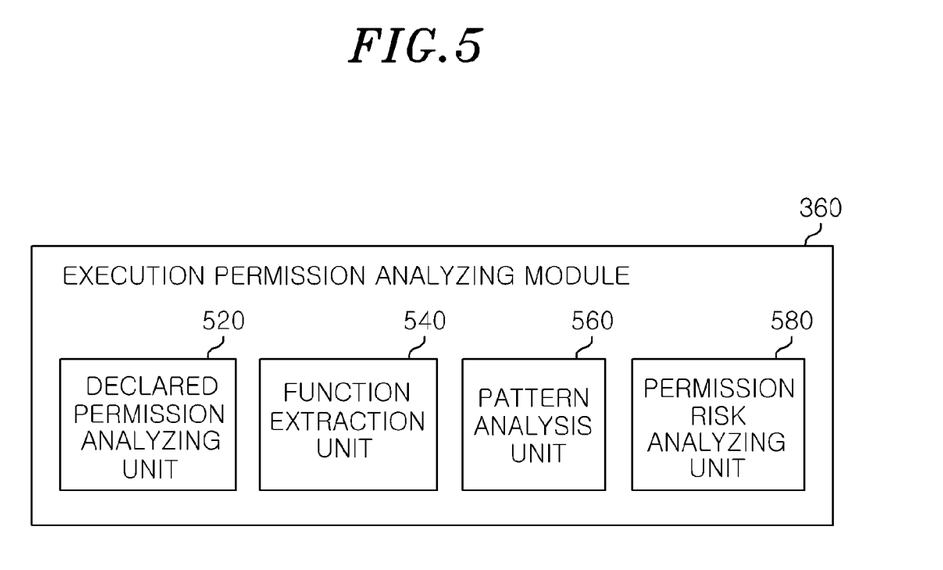
FIG. 5 is a block diagram showing an internal configuration of an execution permission analyzing module in accordance with an embodiment of the present invention.

FIG. 5 is a block diagram showing an internal configuration of an execution permission analyzing module 360 in accordance with an embodiment of the present invention.

Referring to FIG. 5, the execution permission analyzing module 360 includes a declared permission analyzing unit 520, a function extraction unit 540, a pattern analysis unit 560 and a permission risk analyzing unit 580.

First, the declared permission analyzing unit 520 performs a conversion of the androidmanifest.xml file and analyzes the permission contained in the converted androidmanifest.xml file. More specifically, the androidmanifest.xml file is not allowed to view the contents immediately since it is encrypted with a binary; and, therefore, the declared permission analyzing unit 520 needs to convert the androidmanifest.xml file before analyzing it. A following is an example of the conversion process.

java-jar AXMLPrinter2.jar androidManifest.xml>output.xml

After that, the permission contained in the converted androidmanifest.xml is analyzed. For example, specifically, the analysis is made on whether permission is declared excessively. The term "permission is declared excessively" used herein refers to a case where while an application requires a permission A only for its execution, a developer declares even a permission B, in addition to the permission A.

Meanwhile, the function extraction unit 540 extracts a function from the Java source code that has been converted from the classes.dex and analyzes the permission based on the extracted function. Specifically, the function extraction unit 540 analyzes and investigates whether the function uses the permission that has not been undeclared.

Closely surveying the function of the function extraction unit 540, for example, it is assumed that an application A has information about an SMS of individuals and position information of individuals and includes a function B accessible from the outside. In this case, the information about the SMS can be accessed from the outside. However, even though the location information of the individuals has been declared to block an access thereto, the location information of individuals can be accessed in bypassing manner when the function B, which is accessible from the outside, is used. As such, the function extraction unit is able to detect whether a function uses the permission that is not declared.

Next, the pattern analysis unit 560 compares the pattern called by the function and a pre-defined pattern in which there is a risk to analyze the risk. The term "pre-defined pattern in which there is a risk" is referred to a set of function call patterns which are pre-defined to contain a risk in advance. Specifically, for example, in a case where a call is made in a sequence of an internal data access function→Internet connection function→an SMS transmission function, internal data of a mobile device may be sent to the outside from the SMS, which is equivalent to the pre-defined pattern.

Finally, the permission risk analyzing unit 580 functions to detect a risk based on the analysis results from the declared permission analyzing unit 520, the function extraction unit 540 and the pattern analysis unit 560. More specifically, the permission risk analyzing unit 580 defines the number of permissions that are not declared but are used, the number of functions that use the permission that are not declared. The following is an embodiment that is defined by the permission risk analyzing unit 580, but is not limited thereto:

the number of permissions categories that are declared, the number of permissions that are declared, the number of permissions that are used, the number of permissions that are used after the declaration of permission, the number of permissions that are not used after the declaration of permission, the number of permissions that are used without the declaration of permission, the number of functions that use the permissions that are declared, the number of functions that use the permissions without the declaration of permission.

In accordance with an embodiment of the present invention, the permission risk analyzing unit 580 defines the analysis results as described above and represents the risk as digits from 1 to 9 in conformity with the defined analysis results.

Figure 6A:
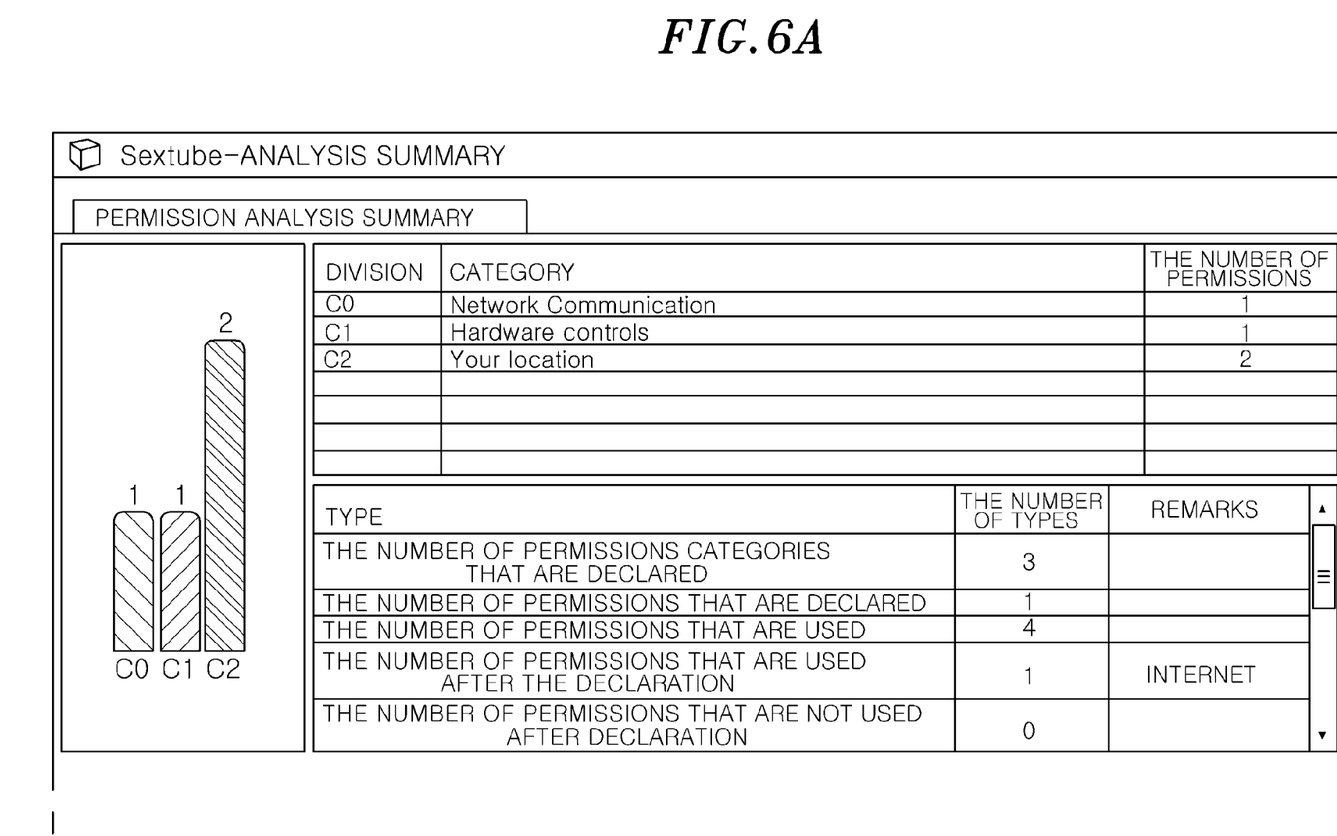
FIGS. 6A and 6B are one exemplary screen among a plurality of screens that the analyzed permissions are reported in accordance with an embodiment of the present invention.
Figure 6B:
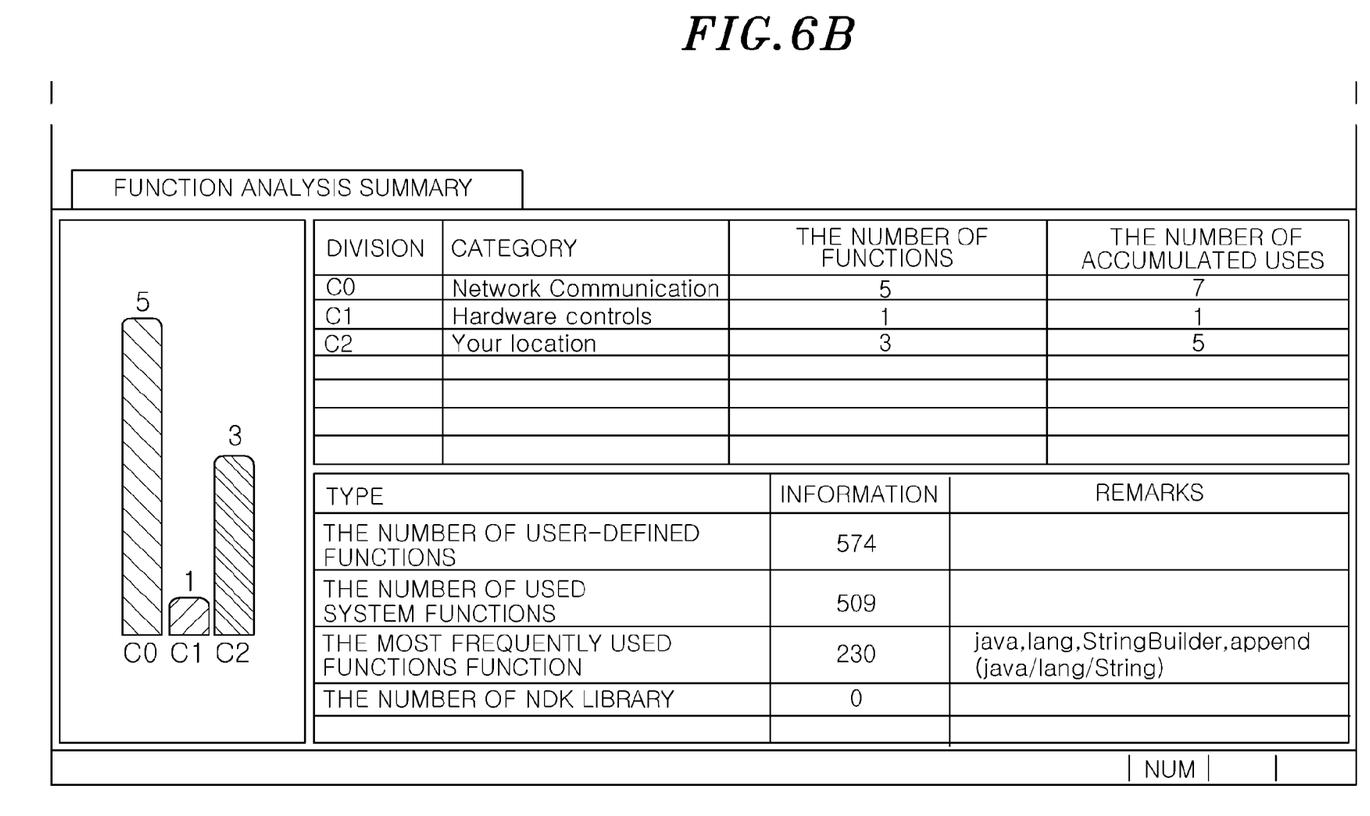

Although not shown in the drawings, the embodiment of the present invention may further include an analysis result reporting unit for reporting the calculated risk to the administrator of the centralized management center. FIGS. 6A and 6B are one exemplary screen among a plurality of screens that the analyzed permissions are reported in accordance with an embodiment of the present invention.

Figure 7:
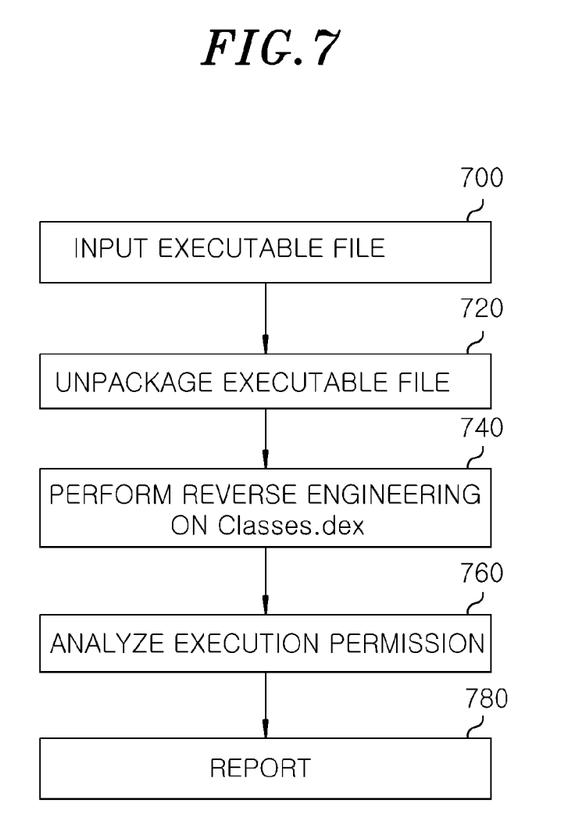
FIG. 7 is a flowchart illustrating a method for analyzing permission to report the analyzed permission in accordance with an embodiment of the present invention.

FIG. 7 is a flowchart illustrating a method for analyzing the permission to report the analyzed permission in accordance with an embodiment of the present invention.

Referring FIG. 7, FIG. 3, FIG. 4B and FIG. 5, the file extraction module 340 shown in FIG. 3 in accordance with an embodiment or the present invention receives an executable file of an application, in an operation 700. The unpackaging unit 442 shown in FIG. 4B unpackages the received executable file, in an operation 720, and the reverse engineering unit 444 shown in FIG. 4B performs a reverse engineering on a classes.dex file among the unpackaged files, in an operation 740. Thereafter, the execution permission analyzing module 360 shown in FIG. 5 analyzes information about the permission on the basis of an androidManifest.xml among the unpackaged files and the classes.dex file which has been subjected to the reverse engineering and detects a risk, in an operation 760. Subsequently, the analysis result reporting unit (not shown) reports the analysis result and risk to the administrator of the centralized management center, in an operation 780.

As described above, it is possible to verify that the apparatus and method in accordance with an embodiment of the present invention detects whether permission is declared more than the execution permission required to run the application, or a function is set to use permission that is not declared to report the analysis result to the administrator.

The embodiments of the present invention described above may be implemented in the form of program instructions that can be run through various components of computers and may be recorded on a computer-readable recording medium. The computer-readable recording medium may include alone or in combination with the program instructions, data files, data structures, and the like. The program instructions recorded on the computer-readable recording medium may be ones that are designed and constructed specifically for the present invention, or are known and available to those skilled in the computer software arts. Examples of the computer-readable recording medium may include magnetic recording media such as hard disks, floppy disks, and magnetic tapes; optical recording media such as CD-ROM and DVD; magneto-optical media such as floptical disks; and hardware devices such as ROM, RAM, flash memory, etc. that are specially configured to store and perform the program instructions. Examples of the program command include higher level codes that may be executed by a computer using interpreters as well as machine codes that are created by compilers. The hardware apparatus may be configured to act as one or more software modules in order to perform processes according to the present invention, and vice versa.

While the present invention has been shown and described with reference to specific matters such as the concrete components and definitive embodiments and drawings, these are merely provided only for the general understanding of the present invention, not limited to the foregoing embodiments, and may be changed and modified in various forms from the disclosure to a person having ordinary skill in the art to which the invention belongs.

Therefore, the spirit of the present invention is defined by the appended claims rather than by the foregoing embodiments, and all changes and modifications that fall within the claims, or equivalents thereof are intended to be embraced by the scope of the present invention.

What is claimed is:

1. An apparatus for analyzing a permission of an application for a mobile device, the apparatus comprising:
    an executable file acquisition device configured to acquire an executable file of the application;
    a file extraction device including an unpackaging section, wherein the unpacking section is configured to unpackage the executable file to extract a first file which describes the information about permission that is declared in the application and a permission that the application uses; and
    an execution permission analyzing device configured to detect a security risk which can be caused by the permission on the basis of the permission described in the extracted file,
    wherein the information related to the permission of the application comprises:
    information on permission that is declared in the application, permission that the application uses and a function that uses the permission of the application.

2. The apparatus of claim 1, wherein the file extraction device further includes:
    a reverse engineering section configured to perform a reverse engineering on a second file that contains information on a function that uses the permission of the application among the unpackaged files by the unpackaging unit.

3. The apparatus of claim 2, wherein the reverse engineering section is configured to convert the second file into a file having an extension of class or jar, which in turn is converted into a file having an extension of Java.

4. The apparatus of claim 2, wherein the execution permission analyzing device comprises:
    a declared permission analyzing section configured to analyze the first file;

a function extraction section configured to parse the result that the second file has been subjected to the reverse engineering to extract the function that the application uses;

a pattern analyzing section configured to analyze the risk on the basis of a pre-defined pattern; and a permission risk analyzing section configured to analyze the permission related to the application on the basis of the results of the declared permission analyzing unit, the function extraction unit and the pattern analysis unit and detect the risk, wherein the pre-defined pattern represents a pattern to call the function.

5. The apparatus of claim 4, wherein the permission risk analysis section is configured to detect that a risk exists when there is at least one of a case where the permission is declared independently, a case where the declared permission has not been used, a case where the permission that are not declared is used via a function, or a case where a pattern that a function calls is identical to the pre-defined pattern in which there is the risk.

6. The apparatus of claim 2, wherein the application is an application for Android;

the executable file of the application has an extension of apx;

the first file is an androidmanifest.xml file; and the second file is a classes.dex file.

7. The apparatus of claim 1, further comprises:

an analysis result reporting device configured to display the result analyzed by the execution permission analyzing module.

8. A method for analyzing a permission of an application for mobile devices, the method comprising:

acquiring an executable file from the application for mobile devices;

unpackaging the executable file to extract a first file, which describes the information about permission that is declared in the application and permission that the application uses; and detecting a security risk which can be caused by the permission on the basis of the permission described in the extracted file, wherein the information related to the permission of the application comprises:

information on a permission that is declared in the application, permission that the application uses, and a function that uses the permission of the application.

9. The method of claim 8, wherein said unpackaging the executable file to extract a first file further comprises:

performing a reverse engineering on a second file that contains information on a function that uses the permission of the application among the unpackaged files.

10. The method of claim 9, wherein said performing a reverse engineering on a second file comprises:

converting the second file into a file having an extension of class or jar, which in turn is converted into a file having an extension of Java.

11. The method of claim 9, wherein said detecting a security risk comprises:

analyzing the first file;

extracting a function that the application uses by parsing the result that the second file has been subjected to the reverse engineering;

analyzing the risk on the basis of a pre-defined pattern; and analyzing the permission related to the application based on the results of said analyzing the first file, said extracting a function, and said analyzing the risk and detecting the risk, wherein the pre-defined pattern represents a pattern to call the function.

12. The method of claim 11, wherein said analyzing the permission related to the application comprises:

detecting that a risk exists when there is at least one of a case where the permission is declared independently, a case where the declared permission has not been used, a case where the permission that are not declared is used via a function, or a case where a pattern that a function calls is identical to the pre-defined pattern in which there is the risk.

13. The method of claim 9, wherein the application is an application for Android;

the executable file of the application has an extension of apx;

the first file is an androidmanifest.xml file; and the second file is a classes.dex file.

14. The method of claim 8, further comprising:

reporting the analysis result analyzed by analyzing the permission related to the application so as to display it.

15. A non-transitory computer-readable storage medium including computer executable instructions, wherein the instructions, when executed by a processor, causes the processor to perform the method disclosed in claim 8.

* * * * *